US012653757B2

(12) United States Patent
Langsdorf et al.

(10) Patent No.: US 12,653,757 B2
(45) Date of Patent: Jun. 16, 2026

(54) GLASS CONTAINER WITH INCREASED BREAKAGE RESISTANCE

(71) Applicant: SCHOTT Pharma AG & Co. KGaA, Mainz (DE)

(72) Inventors: Andreas Langsdorf, Ingelheim (DE); Florian Maurer, Griesheim (DE); Lucia Dessoy, Bingen (DE); Ina Syndikus, Darmstadt (DE); Alexander Humbertjean, Bad Krozingen (DE); Tobias Wetzel, Sölden (DE); Fatih Mutlu, Neuenburg (DE)

(73) Assignee: SCHOTT Pharma AG & Co. KGaA, Mainz (DE)

( * ) Notice: Subject to any disclaimer, the term of this patent is extended or adjusted under 35 U.S.C. 154(b) by 314 days.

(21) Appl. No.: 18/348,464

(22) Filed: Jul. 7, 2023

(65) Prior Publication Data

US 2024/0009079 A1      Jan. 11, 2024

(30) Foreign Application Priority Data

Jul. 8, 2022      (EP) .................................... 22183918

(51) Int. Cl.
| | |
|---|---|
| *A61J 1/14* | (2023.01) |
| *B65D 1/02* | (2006.01) |
| *C03B 23/09* | (2006.01) |

(52) U.S. Cl.
CPC .......... *A61J 1/1468* (2015.05); *A61J 1/1412* (2013.01); *B65D 1/0207* (2013.01); *C03B 23/092* (2013.01); *C03B 23/099* (2013.01)

(58) Field of Classification Search
CPC ..... A61J 1/1468; B65D 1/0207; C03B 23/092
See application file for complete search history.

(56) References Cited

U.S. PATENT DOCUMENTS

| | | |
|---|---|---|
| 2014/0151371 A1 | 6/2014 | Chang et al. |
| 2021/0000690 A1 | 1/2021 | Langsdorf et al. |
| 2021/0187496 A1 | 6/2021 | Frost et al. |

FOREIGN PATENT DOCUMENTS

DE      196 22 550 A1   12/1997

OTHER PUBLICATIONS

"Injection containers and accessories—Part 1: Injection vials made of glass tubing", ISO 8362-1;2009 + Amd 1:2015 (15 pages).
"Glass Containers—Resistance to vertical load—Test method", DIN EN ISO 8113 : 2004 (6 pages).

*Primary Examiner* — Frank J Vineis
(74) *Attorney, Agent, or Firm* — TAYLOR & EDELSTEIN, PC

(57) ABSTRACT

A glass container includes a body region with a first end and a second end, the body region having an outer diameter ($d_1$) and a glass thickness ($s_1$), the body region being characterized by a longitudinal axis ($L_{tube}$) that passes through a center of the first and second end. When the glass container is standing on a support surface, $h_2$ is the distance between the support surface up to the second end of the body region. The following condition is fulfilled: $(A \times X)/B = C$. A is an axial load necessary to break the glass container to obtain fragments, X is a normalized area in $cm^2$ defined as $h_2 \times d_1 \times \pi + d_1^2/4 \times \pi$, B is a number of fragments of the glass container, and C is a fracture ratio. C is 40 $N \times cm^2$ or more and B is 30 or more.

18 Claims, 6 Drawing Sheets

300

304

100 part A continuation FIG. 2C

300

GLASS CONTAINER WITH INCREASED BREAKAGE RESISTANCE

CROSS REFERENCE TO RELATED APPLICATIONS

This application claims priority to European Patent Application No. 22183918.6 filed on Jul. 8, 2022, which is incorporated in its entirety herein by reference.

BACKGROUND OF THE INVENTION

1. Field of the Invention

The present invention relates to a glass container and to a plurality of glass containers. The present invention also relates to a process for filling such a glass container in an automated filling line and to the use of a glass container or of a plurality of glass containers for increasing the overall equipment effectiveness in automated filling lines.

2. Description of the Related Art

In the pharmaceutical industry, containers are used for the primary packaging of drugs. Among the traditionally most used materials is a glass container, as it ensures stability, visibility, endurance, rigidity, moisture resistance, ease of capping, and economy. The glass containers for medicinal purposes currently on the market include glass containers, made from glass tubing and blow-molded glass containers. The manufacturing methods for tubing-based glass containers and blow-molded glass containers are widely known. Tubing based glass containers are made from prefabricated glass tubing (mother tube) by shaping and separation. In a typical manufacturing process, a glass tube is loaded into the head of a rotary machine, and then, while rotating around its major axis, the tube is heated to its softening point by a flame and is pulled along its major axis for stretching and spreading the portion that has been subjected to heat softening to create and shape the bottom of the desired container. Tubular glass containers include vials, ampoules, bottles, cylindrical injector and syringe bodies, whose shape and size are standard. Blow-molded glass containers are made by shaping a glass melt directly by blowing or press-and-blow processes. The blow-molded glass containers include, for example, spray and infusion bottles, such as those described in DE 196 22 550 A1.

Pharmaceutical glass containers, such as vials obtained from prefabricated glass tubing by shaping and separation, are continuously exposed to certain stresses during processing and use, so that breakage events can occur during filling, transportation and packaging or later during the application of a pharmaceutical composition. Such breakage events not only lead to an undesired exclusion of glass containers from the production process, but also to a standstill of the automated filling lines.

In order to address this issue, highly chemically strengthened pharmaceutical vials have been proposed in the state of the art. Chemically strengthened pharmaceutical vials have an increased strength, so that a breakage occurs only at higher loads. However, breakage fundamentally cannot be ruled out, but only be reduced. Breakage even occurs with highly chemically strengthened vials. In this context, it was observed that especially with highly chemically strengthened vials the downtimes are particularly long when these vials break. In addition, for highly chemically strengthened pharmaceutical vials, due to the high tensile stress on the inside, if damage is caused by contact, breakage or failure can be greatly delayed and thus, occur long after processing, e.g. during the application of a pharmaceutical composition.

What is needed in the art is a way to at least partly overcome a disadvantage arising from the prior art. What is needed in the art is a way to provide glass containers, such as pharmaceutical vials, that—when being processed in, for example, automated filling lines—lead to reduced downtimes of the machines used in these lines compared to glass containers known from the prior art. Moreover, the glass containers, for example the pharmaceutical vials, should be characterized in that a reduced breakage or failure occurs in these vials even long after processing.

SUMMARY OF THE INVENTION

In some exemplary embodiments provided according to the invention, a glass container includes: a top region; a shoulder region; a body region with a first end and a second end, the second end being adjacent to the shoulder region, the body region having an outer diameter $(d_1)$ and a glass thickness $(s_1)$, the body region being characterized by a longitudinal axis $(L_{tube})$ that passes through a center of the first end and the second end; a circular glass bottom closing the body region at the first end; and a curved glass heel extending from an outer end of the circular glass bottom to the first end of the body region. When the glass container is standing on a support surface with the circular glass bottom being in contact with the support surface, $h_2$ is the distance between the support surface up to the second end of the body region. The following condition is fulfilled: $(A \times X)/B = C$, where A is an axial load in N, which is necessary to break the glass container to obtain fragments, X is a normalized area in $cm^2$ defined as $h_2 \times d_1 \times \pi + d_1^2/4 \times \pi$, B is a number of fragments of the glass container, each fragment having a fragment area of $0.3 \ mm^2$ or more and $1.0 \ mm^2$ or less, and C is a fracture ratio. C is $40 \ N \times cm^2$ or more and B is 30 or more.

In some exemplary embodiments provided according to the invention, a plurality of glass containers is provided. Each of the glass containers includes: a top region; a shoulder region; a body region with a first end and a second end, the second end being adjacent to the shoulder region, the body region having an outer diameter $(d_1)$ and a glass thickness $(s_1)$, the body region being characterized by a longitudinal axis $(L_{tube})$ that passes through a center of the first end and the second end; a circular glass bottom closing the body region at the first end; and a curved glass heel extending from an outer end of the circular glass bottom to the first end of the body region. When the glass container is standing on a support surface with the circular glass bottom being in contact with the support surface, $h_2$ is the distance between the support surface up to the second end of the body region. The following condition is fulfilled: $(A \times X)/B = C$, where A is an axial load in N, which is necessary to break the glass container to obtain fragments, X is a normalized area in $cm^2$ defined as $h_2 \times d_1 \times \pi + d_1^2/4 \times \pi$, B is a number of fragments of the glass container, each fragment having a fragment area of $0.3 \ mm^2$ or more and $1.0 \ mm^2$ or less, and C is a fracture ratio. C is $40 \ N \times cm^2$ or more and B is 30 or more.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
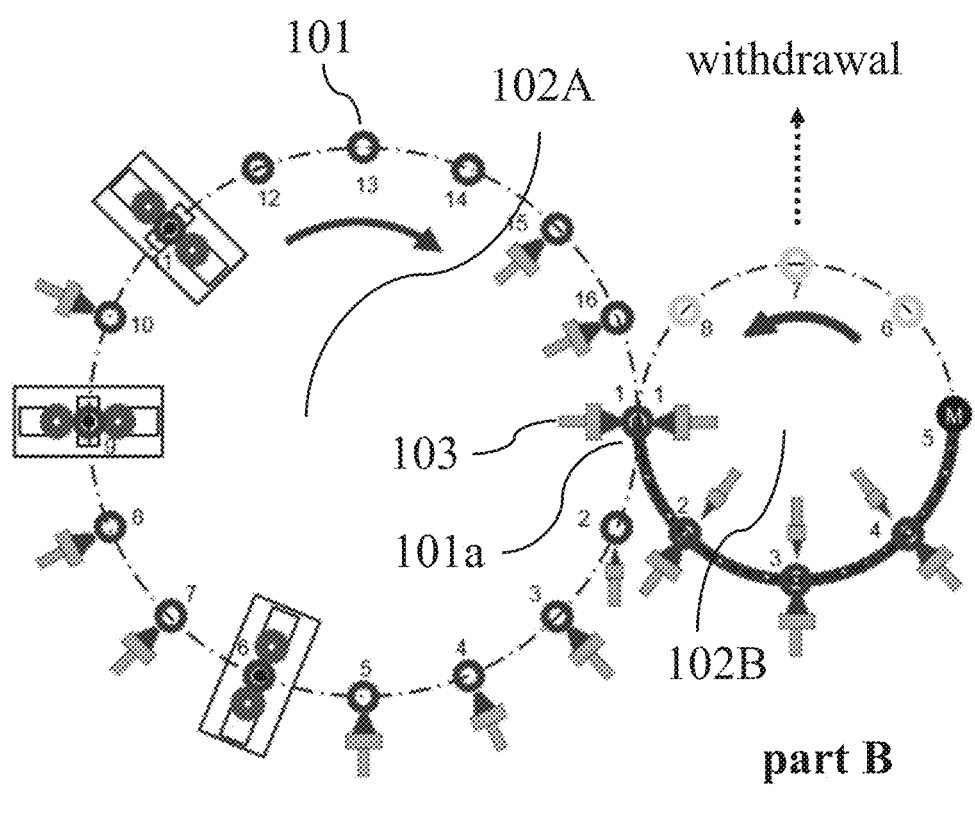
FIG. 1 illustrates a glass processing machine that illustrates a process for the preparation of glass container provided according to the present invention.

In some exemplary embodiments provided according to the invention, a glass container comprises as container parts:

i) a top region;

ii) a shoulder region;

iii) a body region with a first end and a second end, wherein the second end is adjacent to the shoulder region, wherein the body region has an outer diameter $d_1$ and a glass thickness $s_1$, the body region being characterized by a longitudinal axis $L_{tube}$ that passes through the center of the first and the second end;

iv) a circular glass bottom, wherein the circular glass bottom closes the body region at the first end; and v) a curved glass heel extending from an outer end of the circular glass bottom to the first end of the body region; wherein, when the glass container is standing on a support surface with the circular glass bottom being in contact with the support surface, $h_2$ is the distance between the support surface up to second end of the body region;

wherein the following condition is fulfilled:

$$(A \times X)/B = C,$$

wherein:

A is the axial load in N, which is necessary to break the glass container to obtain fragments, X is the normalized area in $cm^2$ defined as $$h_2 \times d_1 \times \pi + d_1^2/4 \times \pi,$$

B is the number of fragments of the glass container, each fragment having a fragment area of $0.3 \text{ mm}^2$ or more and $1.0 \text{ mm}^2$ or less, and C is the fracture ratio, wherein C is 40 N×$cm^2$ or more, optionally 80 N×$cm^2$ or more, optionally 120 N×$cm^2$ or more, optionally 160 N×$cm^2$ or more and optionally 200 N×$cm^2$ or more or more, wherein B is 30 or more.

In some embodiments provided according to the invention, a plurality of glass containers is provided, each glass container comprising as container parts:

i) a top region;

ii) a shoulder region;

iii) a body region with a first end and a second end, wherein the second end is adjacent to the shoulder region, wherein the body region has an outer diameter $d_1$ and a glass thickness $s_1$, the body region being characterized by a longitudinal axis $L_{tube}$ that passes through the center of the first and the second end;

iv) a circular glass bottom, wherein the circular glass bottom closes the body region at the first end;

v) a curved glass heel extending from an outer end of the circular glass bottom to the first end of the body region; wherein, when the glass container is standing on a support surface with the circular glass bottom being in contact with the support surface, $h_2$ is the distance between the support surface up to second end of the body region;

wherein the following condition is fulfilled:

$$(A \times X)/B = C,$$

wherein:

A is the axial load in N, which is necessary to break the glass container to obtain fragments, X is the normalized area in $cm^2$ defined as $$h_2 \times d_1 \times \pi + d_1^2/4 \times \pi,$$

B is the number of fragments of the glass container, each fragment having a fragment area of $0.3 \text{ mm}^2$ or more and $1.0 \text{ mm}^2$ or less, and C is the fracture ratio, wherein for at least 50%, optionally for at least 75%, optionally for at least 90%, optionally for at least 99% and optionally for 100% of the glass containers contained in the plurality of glass containers the fracture ratio C is 40 N×$cm^2$ or more, optionally 80 N×$cm^2$ or more, optionally 120 N×$cm^2$ or more, optionally 160 N×$cm^2$ or more and optionally 200 N×$cm^2$ or more, wherein B is 30 or more.

A "plurality of glass containers" in the sense of the present invention optionally comprises at least 10 glass containers, optionally at least 25 glass containers, optionally at least 50 glass containers, optionally at least 75 glass containers and optionally at least 100 glass containers. Optionally, the plurality of glass containers comprises at most 1000 glass container, optionally at most 500 glass containers. Furthermore, the plurality of glass containers optionally has been collected arbitrarily and particularly has not been selected with regard to any property. For example, the plurality of glass containers may be the group of containers which are packed together in a typical transport tray or nest, optionally in a tub.

In some embodiments of the glass container or the plurality of glass containers provided according to the present invention, the fracture ratio C is 80 N×$cm^2$ or more, optionally 120 N×$cm^2$ or more, optionally 160 N×$cm^2$ or more, optionally 200 N×$cm^2$ or more, optionally 300 N×$cm^2$ or more and optionally 350 N×$cm^2$ or more, and/or 2000 N×$cm^2$ or less, optionally 1000 N×$cm^2$ or less, optionally 800 N×$cm^2$ or less, optionally 500 N×$cm^2$ or less, optionally 450 N×$cm^2$ or less and optionally 400 N×$cm^2$ or less.

In some embodiments of the glass container or the plurality of glass containers provided according to the present invention, the axial load A is 1000 N or more, optionally 2000 N or more, optionally 2500 N or more, optionally 3000 N or more, optionally 3500 N or more and optionally 4000 N or more and/or 8000 N or less, optionally 7000 N or less, optionally 6000 N or less, optionally 5500 N or less, optionally 5000 N or less optionally 4500 N or less.

In some embodiments of the glass container or the plurality of glass containers provided according to the present invention, the number of fragments B is 50 or more, optionally 100 or more, optionally 150 or more, optionally 200 or more, optionally 250 or more and optionally 300 or more, and/or 2800 or less, optionally 2000 or less, optionally 1000 or less, optionally 700 or less, optionally 500 or less, optionally 400 or less and optionally 200 or less.

In some embodiments of the glass container or the plurality of glass containers provided according to the present invention, the normalized fragment area X is 0.35 $mm^2$ or more, optionally 0.4 $mm^2$ or more, optionally 0.45 $mm^2$ or more and optionally 0.5 $mm^2$ and/or 0.95 $mm^2$ or less, optionally 0.9 $mm^2$ or less, optionally 0.85 $mm^2$ or less and optionally 0.8 $mm^2$ or less.

In some embodiments of the glass container or the plurality of glass containers provided according to the present invention, the ratio of number of fragments to normalized area B/X is 0.5 $cm^{-2}$ or more, optionally 0.7 $cm^{-2}$ or more, optionally 4 $cm^{-2}$ or more, optionally 7 cm 2 or more, optionally 9 $cm^{-2}$ or more and optionally 11 $cm^{-2}$ or more, and/or 200 $cm^{-2}$ or less, optionally 100 $cm^{-2}$ or less, optionally 50 $cm^{-2}$ or less, optionally 30 $cm^{-2}$ or less, optionally 25 $cm^{-2}$ or less and optionally 20 $cm^{-2}$ or less.

In some embodiments of the glass container or the plurality of glass containers provided according to the present invention, the glass container further comprises an inner surface directed to the inside of the glass container, an outer surface directed to the outside of the glass container, wherein the inner surface and/or the outer surface exhibits a chemical and/or thermal compressive stress; and/or wherein the inner surface and/or the outer surface exhibit a compressive stress of 800 MPa or less, optionally 600 MPa or less, optionally 400 MPa or less, optionally 200 MPa or less, optionally 100 MPa or less and optionally 70 MPa or less; and/or wherein the inner surface and/or the outer surface exhibit a compressive stress of 10 MPa or more, optionally 20 MPa or more, optionally 30 MPa or more, optionally 40 MPa or more, optionally 50 MPa or more and optionally 60 MPa or more.

In some embodiments of the glass container or the plurality of glass containers provided according to the present invention, the glass container further comprises an inner surface directed to the inside of the glass container, an outer surface directed to the outside of the glass container, wherein the inner surface and/or the outer surface does not exhibit a chemical compressive stress; and/or wherein the inner surface and/or the outer surface exhibit a compressive stress of 10 MPa or less, optionally 9 MPa or less, optionally 8 MPa or less, optionally 7 MPa or less, optionally 6 MPa or less and optionally 5 MPa or less; and/or wherein the inner surface and/or the outer surface exhibit a compressive stress of 0.01 MPa or more, optionally 0.1 MPa or more, optionally 1 MPa or more, optionally 2 MPa or more, optionally 3 MPa or more and optionally 4 MPa or more.

In some embodiments of the glass container or the plurality of glass containers provided according to the present invention, the glass container is a pharmaceutical container and/or a vial.

In some embodiments of the glass container or the plurality of glass containers provided according to the present invention, the glass container is filled with a composition, optionally a pharmaceutical composition, optionally a pharmaceutical composition comprising a pharmaceutical active substance.

In some embodiments of the glass container or the plurality of glass containers provided according to the present invention, the glass container is closed by a closure device, optionally a stopper or a cap, and/or the glass container is stored in a nest and tub, optionally the tub is sealed with a lid and/or enclosed by at least one bag.

In some embodiments of the glass container or the plurality of glass containers provided according to the present invention, the glass container is rotation-symmetric around the longitudinal axis $L_{tube}$ that goes perpendicular through the center of the glass bottom.

In some embodiments of the glass container or the plurality of glass containers provided according to the present invention, throughout the body region the glass thickness $s_1$ of the glass tube is in a range from ±0.2 mm, optionally ±0.1 mm, optionally ±0.08 mm and optionally ±0.05 mm, in each case based on a mean value of this glass thickness in the body region.

In some embodiments of the glass container or the plurality of glass containers provided according to the present invention, $s_1$ is in the range from 0.5 to 3.0 mm, optionally in the range from 0.7 to 1.8 mm, optionally in the range from 0.8 to 1.2 mm, optionally in the range from 0.9 to 1.1 mm and optionally in the range from 0.95 to 1.05 mm.

In some embodiments of glass container or the plurality of glass containers provided according to the present invention, the top region has a maximum outer diameter $d_2 < d_1$, the top region optionally comprising an opening of the glass container.

In some embodiments of the glass container or the plurality of glass containers provided according to the present invention, $d_2$ is in the range from 10 to 60 mm, optionally in the range from 12 to 50 mm, optionally in the range from 12 to 30 mm, optionally in the range from 12 to 25 mm and optionally in the range from 12 to 20 mm.

In some embodiments of glass container or the plurality of glass containers provided according to the present invention, the shoulder region connects the body region with the top region, wherein shoulder region is characterized by a shoulder angle α and wherein α is in the range from 10 to 70°, optionally in the range from 25 to 60°, optionally in the range from 33 to 55°, optionally in the range from 37 to 500 and optionally in the range from 380 to 45°.

In some embodiments of the glass container or the plurality of glass containers provided according to the present invention, the glass container has a mass of glass $m_g$ and an interior volume $V_i$ ($V_i$ representing the overflow capacity of the glass container) and wherein the following condition is fulfilled:

$$m_g / V_i^{0.75} < 2.0,$$

$$\text{optionally } m_g / V_i^{0.75} < 1.75.$$

In some embodiments of the glass container or the plurality of glass containers provided according to the present invention, the glass container has an interior volume $V_i$ in a range from 2 to 150 ml, optionally from 3 to 100 ml, optionally from 3 to 50 ml, optionally from 3 to 15 ml, optionally from 3 to 7 ml.

In some embodiments of the glass container or the plurality of glass containers provided according to the present invention, the glass container has a height $h_t$ in the range from 15 to 100 mm, optionally in the range from 20 to 60 mm, optionally in the range from 25 to 55 mm, optionally in the range from 30 to 50 mm and optionally in the range from 34 to 46 mm, wherein, when the glass container is standing on a support surface with the circular glass bottom being in contact with the support surface, $h_t$ is the distance between the support surface up to end of the top region.

In some embodiments of the glass container or the plurality of glass containers provided according to the present invention, $d_1$ is in the range from 13 to 65 mm, optionally in the range from 15 to 55 mm, optionally in the range from 15 to 35 mm, optionally in the range from 15 to 30 mm and optionally in the range from 15 to 20 mm.

In some embodiments of the glass container or the plurality of glass containers provided according to the present invention, at least one of the properties of the glass container selected from the group consisting of $s_1$, $d_1$, $d_2$, $h_1$, $V_i$ and $h_2$ is within the requirements defined in DIN EN ISO 8362-1: 2016-06.

In some embodiments of the glass container or the plurality of glass containers provided according to the present invention, the glass container is a packaging container for a medical or a pharmaceutical packaging good or both. An exemplary pharmaceutical packaging good is a pharmaceutical composition. Optionally, the glass container 1 is suitable for packaging parenteralia in accordance with section 3.2.1 of the European Pharmacopoeia, 7th edition from 2011.

In some embodiments of the glass container or the plurality of glass containers provided according to the present invention, the glass is of a type selected from the group consisting of a borosilicate glass, an aluminosilicate glass, soda lime glass and fused silica. "Soda lime glass" according to the invention is an alkaline/alkaline earth/silicate glass according to table 1 of ISO 12775 ($1^{st}$ edition 1997-10-15).

In some embodiments provided according to the invention, a process for filling a glass container in an automated filling line comprises:

I) providing a glass container or a plurality of glass containers provided according to the present invention, optionally any of the previously described glass container(s);

II) filling the glass containers with a composition, optionally with a liquid pharmaceutical composition, in an automated filling line;

wherein the automated filling line is operated with an overall equipment effectiveness of at least 400 containers per minute, optionally at least 600 containers per minute, optionally at least 700 containers per minute and optionally at least 800 containers per minute, these values being the average value determined over an operating time of 1 hour.

In some embodiments provided according to the invention, the use of a glass container or a plurality of glass containers provided according to the present invention is provided, optionally any of the previously described glass container(s), for increasing the overall equipment effectiveness in automated filling lines.

Glass Container

The glass container provided according to the invention or the glass container contained in the plurality of glass containers provided according to the invention may have any size or shape which the skilled person deems appropriate in the context of the invention. Optionally, the top region of the glass container comprises an opening, which allows for inserting a pharmaceutical composition into the interior volume of the glass container. An exemplary glass container is a pharmaceutical glass container, optionally one selected from the group consisting of a vial, an ampoule or a combination thereof.

For the use in this document, the interior volume $V_i$ represents the full volume of the interior of the glass container. This volume may be determined by filling the interior of the glass container with water up to the brim and measuring the volume of the amount of water which the interior can take up to the brim. Hence, the interior volume as used herein is not a nominal volume as it is often referred to in the technical field of pharmacy. This nominal volume may, for example, be less than the interior volume by a factor of about 0.5.

The following are exemplary embodiments of the glass container provided according to the present invention (or of the glass container contained in the plurality of glass containers provided according to the present invention).

In some embodiments of the glass container provided according to the present invention (or of the glass container contained in the plurality of glass containers provided according to the present invention) the glass container is a vial with an overflow capacity equal to or larger than 1 ml up to maximal 5 ml, optionally a vial with a size designation "2R" according to DIN EN ISO 8362-1:2016-06, wherein it is furthermore optional that at least one, optionally all, of the following conditions i) to iv) is/are fulfilled:

i) $s_1$ is in the range from 0.4 to 2 mm, optionally in the range from 0.8 to 1.3 mm and optionally in the range from 0.9 to 1.15 mm;

ii) $d_1$ is in the range from 13 to 19 mm, optionally in the range from 14 to 18 mm and optionally in the range from 15 to 17 mm;

iii) $h_2$ is in the range from 19 to 25 mm, optionally in the range from 20 to 24 mm and optionally in the range from 21 to 23 mm; and/or iv) C is 40 N×cm$^2$ or more, optionally 80 N×cm$^2$ or more, optionally 120 N×cm$^2$ or more, optionally 160 N×cm$^2$ or more and optionally 200 N×cm$^2$ or more.

In some embodiments of the glass container provided according to the present invention the glass container is a vial with an overflow capacity of larger than 4 ml up to maximal 8 ml, optionally a vial with a size designation "4R" according to DIN EN ISO 8362-1:2016-06, wherein it is furthermore optional that at least one, optionally all, of the following conditions i) to iv) is/are fulfilled:

i) $s_1$ is optionally in the range from 0.9 to 1.15 mm;

ii) $d_1$ is in the range from 13 to 19 mm, optionally in the range from 14 to 18 mm and optionally in the range from 15 to 17 mm;

iii) $h_2$ is in the range from 29 to 35 mm, optionally in the range from 30 to 34 mm and optionally in the range from 31 to 33 mm; and/or iv) C is 40 N×cm$^2$ or more, optionally 80 N×cm$^2$ or more, optionally 120 N×cm$^2$ or more, optionally 160 N×cm$^2$ or more and optionally 200 N×cm$^2$ or more.

In some embodiments of the glass container provided according to the present invention the glass container is a vial with an overflow capacity of larger than 8 ml up to maximal 10.75 ml, optionally a vial with a size designation "6R" according to DIN EN ISO 8362-1:2016-06, wherein it is furthermore optional that at least one, optionally all, of the following conditions i) to iv) is/are fulfilled:

i) $s_1$ is optionally in the range from 0.9 to 1.15 mm;

ii) $d_1$ is in the range from 19 to 25 mm, optionally in the range from 20 to 24 mm and optionally in the range from 21 to 23 mm;

iii) $h_2$ is in the range from 23 to 29 mm, optionally in the range from 24 to 28 mm and optionally in the range from 25 to 27 mm; and/or iv) C is 40 N×cm² or more, optionally 80 N×cm² or more, optionally 120 N×cm² or more, optionally 160 N×cm² or more and optionally 200 N×cm² or more.

In some embodiments of the glass container provided according to the present invention the glass container is a vial with an overflow capacity of larger than 10.75 ml up to maximal 12.5 ml, optionally a vial with a size designation "8R" according to DIN EN ISO 8362-1:2016-06, wherein it is furthermore optional that at least one, optionally all, of the following conditions i) to iv) is/are fulfilled:

i) $s_1$ is optionally in the range from 0.9 to 1.15 mm;

ii) $d_1$ is in the range from 19 to 25 mm, optionally in the range from 20 to 24 mm and optionally in the range from 21 to 23 mm;

iii) $h_2$ is in the range from 28 to 34 mm, optionally in the range from 29 to 33 mm and optionally in the range from 30 to 32 mm; and/or iv) C is 40 N×cm² or more, optionally 80 N×cm² or more, optionally 120 N×cm² or more, optionally 160 N×cm² or more and optionally 200 N×cm² or more.

In some embodiments of the glass container provided according to the present invention the glass container is a vial with an overflow capacity of larger than 12.5 ml up to maximal 16.25 ml, optionally a vial with a size designation "10R" according to DIN EN ISO 8362-1:2016-06, wherein it is furthermore optional that at least one, optionally all, of the following conditions i) to iv) is/are fulfilled:

i) $s_1$ is optionally in the range from 0.9 to 1.15 mm;

ii) $d_1$ is in the range from 21 to 27 mm, optionally in the range from 22 to 26 mm and optionally in the range from 23 to 25 mm;

iii) $h_2$ is in the range from 27 to 33 mm, optionally in the range from 28 to 32 mm and optionally in the range from 29 to 31 mm; and/or iv) C is 40 N×cm² or more, optionally 80 N×cm² or more, optionally 120 N×cm² or more, optionally 160 N×cm² or more and optionally 200 N×cm² or more.

In some embodiments of the glass container provided according to the present invention the glass container is a vial with an overflow capacity of larger than 16.25 ml up to maximal 22.5 ml, optionally a vial with a size designation "15R" according to DIN EN ISO 8362-1:2016-06, wherein it is furthermore optional that at least one, optionally all, of the following conditions i) to iv) is/are fulfilled:

i) $s_1$ is in the range from 0.4 to 2 mm and optionally in the range from 0.9 to 1.15 mm; ii) $d_1$ is in the range from 21 to 27 mm, optionally in the range from 22 to 26 mm and optionally in the range from 23 to 25 mm;

iii) $h_2$ is in the range from 42 to 48 mm, optionally in the range from 43 to 47 mm and optionally in the range from 44 to 46 mm; and/or iv) C is 40 N×cm² or more, optionally 80 N×cm² or more, optionally 120 N×cm² or more, optionally 160 N×cm² or more and optionally 200 N×cm² or more.

In some embodiments of the glass container provided according to the present invention the glass container is a vial with an overflow capacity of larger than 22.5 ml up to maximal 29.25 ml, optionally a vial with a size designation "20R" according to DIN EN ISO 8362-1:2016-06, wherein it is furthermore optional that at least one, optionally all, of the following conditions i) to iv) is/are fulfilled:

i) $s_1$ is in the range from 0.5 to 2.5 mm, optionally in the range from 0.9 to 1.6 mm and optionally in the range from 1.15 to 1.25 mm;

ii) $d_1$ is in the range from 27 to 33 mm, optionally in the range from 28 to 32 mm and optionally in the range from 29 to 31 mm;

iii) $h_2$ is in the range from 32 to 38 mm, optionally in the range from 33 to 37 mm and optionally in the range from 34 to 36 mm; and/or iv) C is 40 N×cm² or more, optionally 80 N×cm² or more, optionally 120 N×cm² or more, optionally 160 N×cm² or more and optionally 200 N×cm² or more.

In some embodiments of the glass container provided according to the present invention the glass container is a vial with an overflow capacity of larger than 29.25 ml up to maximal 35 ml, optionally a vial with a size designation "25R" according to DIN EN ISO 8362-1:2016-06, wherein it is furthermore optional that at least one, optionally all, of the following conditions i) to iv) is/are fulfilled:

i) $s_1$ is in the range from 0.5 to 2.5 mm, optionally in the range from 0.9 to 1.6 mm and optionally in the range from 1.15 to 1.25 mm;

ii) $d_1$ is in the range from 27 to 33 mm, optionally in the range from 28 to 32 mm and optionally in the range from 29 to 31 mm;

iii) $h_2$ is in the range from 42 to 48 mm, optionally in the range from 43 to 47 mm and optionally in the range from 44 to 46 mm; and/or iv) C is 40 N×cm² or more, optionally 80 N×cm² or more, optionally 120 N×cm² or more, optionally 160 N×cm² or more and optionally 200 N×cm² or more.

In some embodiments of the glass container provided according to the present invention the glass container is a vial with an overflow capacity of larger than 35 ml up to maximal 49.75 ml, optionally a vial with a size designation "30R" according to DIN EN ISO 8362-1:2016-06, wherein it is furthermore optional that at least one, optionally all, of the following conditions i) to iv) is/are fulfilled:

i) $s_1$ is in the range from 0.5 to 2.5 mm, optionally in the range from 0.9 to 1.6 mm and optionally in the range from 1.15 to 1.25 mm;

ii) $d_1$ is in the range from 27 to 33 mm, optionally in the range from 28 to 32 mm and optionally in the range from 29 to 31 mm;

iii) $h_2$ is in the range from 52 to 58 mm, optionally in the range from 53 to 57 mm and optionally in the range from 54 to 56 mm; and/or iv) C is 40 N×cm² or more, optionally 80 N×cm² or more, optionally 120 N×cm² or more, optionally 160 N×cm² or more and optionally 200 N×cm² or more.

In some embodiments of the glass container provided according to the present invention the glass container is a vial with an overflow capacity of larger than 49.75 ml up to maximal 92.5 ml, optionally a vial with a size designation "50R" according to DIN EN ISO 8362-1:2016-06, wherein it is furthermore optional that at least one, optionally all, of the following conditions i) to iv) is/are fulfilled:

i) $s_1$ is in the range from 0.4 to 2.5 mm, optionally in the range from 1.3 to 1.8 mm and optionally in the range from 1.45 to 1.55 mm;

ii) $d_1$ is in the range from 37 to 43 mm, optionally in the range from 38 to 42 mm and optionally in the range from 39 to 41 mm;

iii) $h_2$ is in the range from 46 to 52 mm, optionally in the range from 47 to 51 mm and optionally in the range from 48 to 50 mm; and/or iv) C is 40 N×cm² or more, optionally 80 N×cm² or more, optionally 120 N×cm² or more, optionally 160 N×cm² or more and optionally 200 N×cm² or more.

In some embodiments of the glass container provided according to the present invention the glass container is a vial with an overflow capacity of larger than 92.5 ml up to maximal 150 ml, optionally a vial with a size designation "100R" according to DIN EN ISO 8362-1:2016-06, wherein it is furthermore optional that at least one, optionally all, of the following conditions i) to iv) is/are fulfilled:

i) $s_1$ is in the range from 0.4 to 2.5 mm, optionally in the range from 1.3 to 1.8 mm and optionally in the range from 1.65 to 1.75 mm;

ii) $d_i$ is in the range from 44 to 50 mm, optionally in the range from 45 to 49 mm and optionally in the range from 46 to 48 mm;

iii) $h_2$ is in the range from 72 to 78 mm, optionally in the range from 73 to 77 mm and optionally in the range from 74 to 76 mm; and/or iv) C 40 N×cm$^2$ or more, optionally 80 N×cm$^2$ or more, optionally 120 N×cm$^2$ or more, optionally 160 N×cm$^2$ or more and optionally 200 N×cm$^2$ or more.

Glass

The glass of the container may be any type of glass and may consist of any material or combination of materials which the skilled person deems suitable in the context of the invention. Optionally, the glass is suitable for pharmaceutical packaging. In some embodiments, the glass is of type I, optionally type I b, in accordance with the definitions of glass types in section 3.2.1 of the European Pharmacopoeia, 7$^{th}$ edition from 2011. Additionally, or alternatively to the preceding, the glass is selected from the group consisting of a borosilicate glass, an aluminosilicate glass, soda lime glass and fused silica; or a combination of at least two thereof. For the use in this document, an aluminosilicate glass is a glass which has a content of $Al_2O_3$ of more than 8 wt.-%, optionally more than 9 wt.-%, for example in a range from 9 to 20 wt.-%, in each case based on the total weight of the glass. An exemplary aluminosilicate glass has a content of $B_2O_3$ of less than 8 wt.-%, optionally at maximum 7 wt.-%, optionally in a range from 0 to 7 wt.-%, in each case based on the total weight of the glass. For the use in this document, a borosilicate glass is a glass which has a content of $B_2O_3$ of at least 1 wt.-%, optionally at least 2 wt.-%, optionally at least 3 wt.-%, optionally at least 4 wt.-%, optionally at least 5 wt.-%, for example in a range from 5 to 15 wt.-%, in each case based on the total weight of the glass. An exemplary borosilicate glass has a content of $Al_2O_3$ of less than 7.5 wt.-%, optionally less than 6.5 wt.-%, optionally in a range from 0 to 5.5 wt.-%, in each case based on the total weight of the glass. In some embodiments, the borosilicate glass has a content of $Al_2O_3$ in a range from 3 to 7.5 wt.-%, optionally in a range from 4 to 6 wt.-%, in each case based on the total weight of the glass.

In some embodiments, the glass provided according to the invention is essentially free from B. Therein, the wording "essentially free from B" refers to glasses which are free from B which has been added to the glass composition by purpose. This means that B may still be present as an impurity, but optionally at a proportion of not more than 0.1 wt.-%, optionally not more than 0.05 wt.-%, in each case based on the weight of the glass.

Process for Preparing the Glass Container Provided According to the Present Invention One approach of preparing a glass container provided according to the present invention is to apply a process for the preparation of a glass container from a glass tube having an outer diameter $d_1$ and a wall thickness $s_1$ in a glass processing machine, wherein the glass tube comprises a first portion with a first end, a second portion with a second end and a longitudinal axis $L_{tube}$ that passes through the center of the first and the second end, wherein the glass processing machine comprises a plurality of processing stations, first and second clamping chucks which are adapted and arranged to hold the glass tube while rotating the glass tube around its longitudinal axis $L_{tube}$ and to transport the rotating glass tube from one glass container processing station to the next one, a heating device and a mold matrix, optionally a mold matrix that comprises, optionally that is made of, carbon and/or ceramic, wherein the process comprises the steps of:

I) heating the glass tube at a defined position between the first portion and the second portion to a temperature above the glass transition temperature, optionally above the softening temperature of the glass, while the glass tube is rotating around its longitudinal axis $L_{tube}$ and pulling apart the first portion and the second portion thereby separating the first portion from the second portion and forming a closed bottom at one end of the first portion;

II) moving the mold matrix towards the closed bottom and bringing the mold matrix into contact with the closed bottom; wherein, while bringing the mold matrix into contact with the closed bottom in process step II), a distance $Y_m$ between the mold matrix and the first clamping chuck is decreased stepwise (see FIGS. 1 and 2).

The "softening temperature" of the glass is the temperature at which the glass has a viscosity (determined according to ISO 7884-6:1987) of $10^{7.6}$ dPa×sec.

Figures 3A, 3B, 3C:
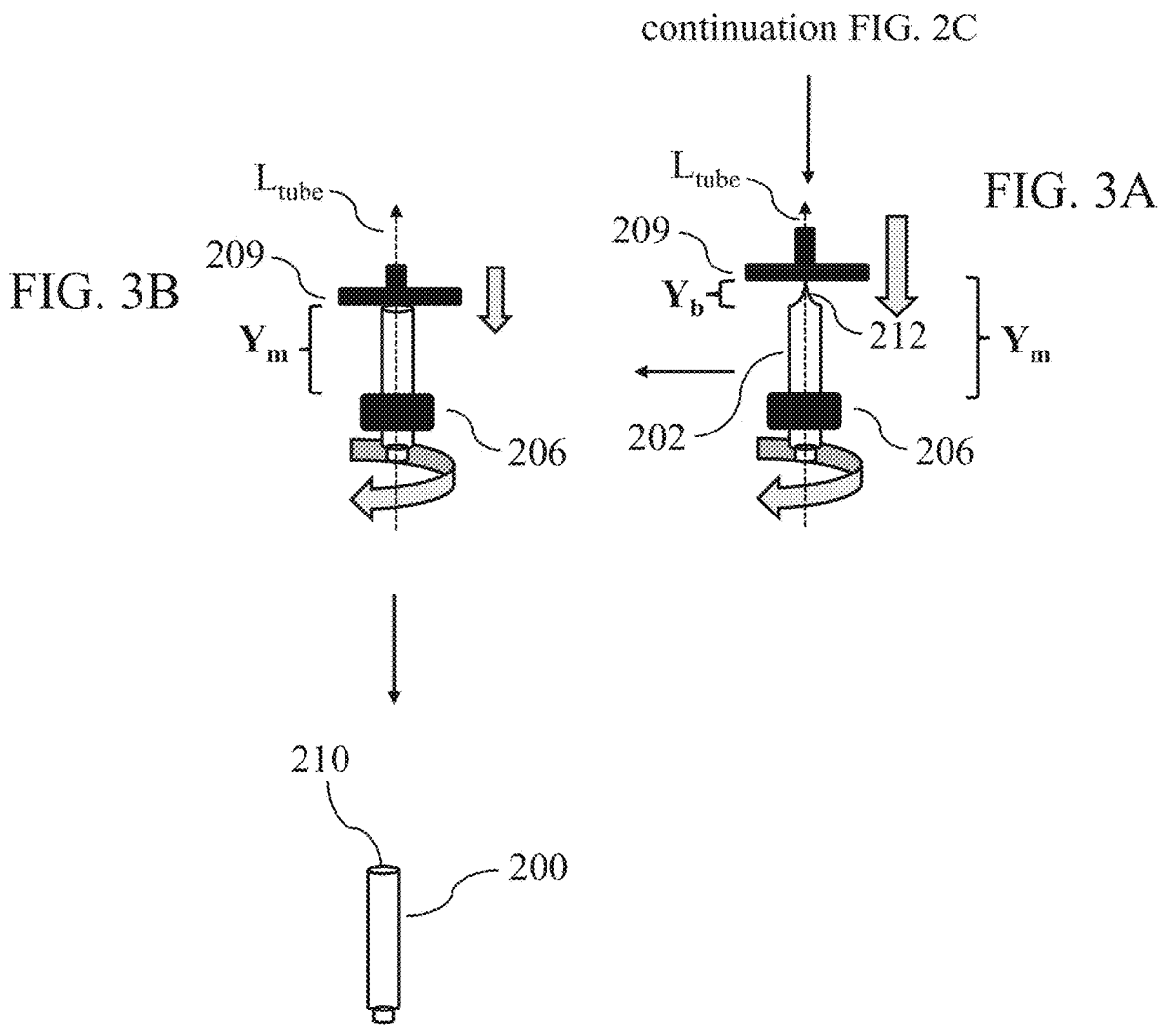
FIGS. 3A-C illustrate process step II) of this process.

The "distance $Y_m$ between the mold matrix and the first clamping chuck" is the shortest distance between the upper end of the first clamping chuck and the bottom end of the mold matrix, i.e., the surface of the mold matrix that comes into contact with the mass of molten glass, wherein $Y_m$ is measured in a direction parallel to longitudinal axis $L_{tube}$ as shown in FIGS. 3A and 3B.

Optionally, the first and second clamping chucks are adapted and arranged to hold the glass tube in a vertical position;

wherein the second portion of the glass tube corresponds to the upper portion of the glass tube having an upper end and the first portion of the glass tube corresponds to the lower portion of the glass tube having a lower end;

wherein the first clamping chucks are arranged as lower clamping chucks holding the lower portion of the glass tube and the second clamping chucks are arranged as upper clamping chucks holding the upper portion of the glass tube; and/or wherein the one end is opposite of the lower end.

In some embodiments of this process, the process further comprises a step Ia), between process step I) and process step II), of heating the closed bottom to a temperature above the glass transition temperature, optionally above the softening temperature of the glass.

In some embodiments of this process, the process further comprises a step Ia), between process step I) and process step II), of heating the closed bottom to a temperature above the glass transition temperature, optionally above the softening temperature of the glass.

In some embodiments of this process, the process further comprises a step Ib), between process step I) and process step II), optionally between step Ia) and step II), of moving the mold matrix towards the closed bottom;

wherein the closed bottom is not in contact with the mold matrix; and/or wherein the final distance defined by a gap $Y_b$ between the closed bottom and the mold matrix is 8 mm or more, optionally 10 mm or more, optionally 12 mm or more, and/or 20 mm or less, optionally 18 mm or less, optionally 16 mm or less. The "final distance" defined by a gap $Y_b$ optionally corresponds to the static distance of the mold matrix from the closed bottom in the corresponding process step after any movement and is measured in a direction parallel to longitudinal axis $L_{tube}$ as shown in FIG. 4. The "gap $Y_b$" is optionally the shortest distance between outermost point (largest radius) of closed bottom surface and contact surface of the mold matrix, this distance again being measured in a direction parallel to longitudinal axis $L_{tube}$ as shown in FIG. 4.

In some embodiments of this process, in process step II), optionally in process steps Ib) and II), the mold matrix is moved downwards;

wherein optionally in process step I) the lower portion of the glass tube is pulled downwards by moving downwards the lower clamping chucks.

In some embodiments of this process, an air flow is applied through the first end of the first portion towards the closed bottom, optionally during process step II), optionally during process steps Ia), Ib) and II).

In some embodiments of this process, an air flow directed towards the closed bottom is applied; optionally during process step II), optionally during process steps Ib) and II).

In some embodiments of this process, the distance $Y_m$ between the mold matrix and the first clamping chuck in process step II) is decreased in a first step IIa) and a second step IIb), optionally further decreased in a third step IIc). In this context it is provided that the mold matrix may be in contact with 50% or more, optionally 55% or more, optionally 60% or more, optionally 65% or more, and/or 90% or less, optionally 85% or less, optionally 80% or less, optionally 75% or less, of the surface area of the closed bottom during the first step IIa). The "surface area of the closed bottom" is optionally $\pi \times (d_1/2)^2$, wherein $d_1$ corresponds to outer diameter of the glass tube as that is heated in process step I).

In this context it is also provided that the mold matrix may be in contact with 65% or more, optionally 70% or more, optionally 75% or more, optionally 80% or more, and/or 100% or less, optionally 97% or less, optionally 95% or less, optionally 90% or less, of the surface area of the closed bottom during the second step IIb).

In some embodiments of this process, the distance $Y_m$ between the mold matrix and the first clamping chuck is decreased in a first step IIa) by a first distance $Y^1_m$ and a second step IIb) by a second distance $Y^2_m$, wherein the first step IIa) and the second step IIb) are optionally successive. In this context it may be provided that the first distance $Y^1_m$ is larger than the second distance $Y^2_m$, wherein the ratio between the first distance $Y^1_m$ and the second distance $Y^2_m$ is optionally at least 10:1, optionally at least 15:1, optionally at least 30:1, optionally 50:1 and/or optionally less than 1000:1, optionally less than 500:1 and optionally less than 100:1. In this context it also may be provided that the first distance $Y^1_m$ is 19 mm or less, optionally 17 mm or less, optionally 15 mm or less, optionally 13 mm or less, and/or 5 mm or more, optionally 7 mm or more, optionally 9 mm or more, optionally 11 mm or more. The second distance $Y^2_m$ is optionally 1 mm or less, optionally 0.8 mm or less, optionally 0.6 mm or less, optionally 0.5 mm or less, and/or 0.1 mm or more, optionally 0.2 mm or more, optionally 0.3 mm or more, optionally 0.4 mm or more.

In some embodiments of this process, there is a time delay $\Delta t$ between the first step IIa) and the second step IIb), wherein it may be provided that the time delay $\Delta t$ is 0.1 sec or more, optionally 0.5 sec or more, optionally 1 sec or more, optionally 1.5 sec or more, and/or 5 sec or less, optionally 4 sec or less, optionally 3 sec or less, optionally 2 sec or less.

In some embodiments of this process, the final distance defined by a gap $Y_b$ between the mold matrix and closed bottom is in a first step IIa) defined by a first gap $Y^1_b$ and in a second step IIb) defined by a second gap $Y^2_b$, optionally the first step IIa) and the second step IIb) are successive. Optionally, the first gap $Y^1_b$ is larger than the second gap $Y^2_b$. In this context may also be provided that the ratio between the first gap $Y^1_b$ and the second gap $Y^2_b$ is at least 5:1, optionally at least 7:1, optionally at least 10:1, optionally at least 15:1 and/or optionally less than 200:1, optionally less than 100:1. In this context it also may be provided that the first gap $Y^1_b$ is 8 mm or less, optionally 7 mm or less, optionally 6 mm or less, optionally 5 mm or less, and/or 1 mm or more, optionally 2 mm or more, optionally 3 mm or more, optionally 4 mm or more. It also may be provided that the second gap $Y^2_b$ is 2 mm or less, optionally 1 mm or less, optionally 0.8 mm or less, optionally 0.6 mm or less, optionally 0.5 mm or less and/or 0.05 mm or more, optionally 0.1 mm or more, optionally 0.2 mm or more, optionally 0.3 mm or more, optionally 0.4 mm or more.

Measurement Methods

The following measurement methods are to be used in the context of the invention. Unless otherwise specified, the measurements have to be carried out at an ambient temperature of 23° C., an ambient air pressure of 100 kPa (0.986 atm) and a relative atmospheric humidity of 50%.

Axial Compression Strength Testing

The axial load A of the vial is determined by vertical load strength testing in accordance to DIN EN ISO 8113 ("Glass containers—Resistance to vertical load—Test methods"), where a compressive force is applied in axial direction and is increased with a constant load rate of 2000 N/min until breakage of the container. During the test the containers are enclosed by a paper bag in order to collect the fragments after breakage.

Determination of Fragments

After axial compression strength testing, all fragments are coated (sputtered) with an approximately 45 nm thick platinum layer to increase contrast for visual analysis. For each container, the number of all fragments with projected area larger 0.3 mm², each fragment's individual area and circumference are determined by means of a camera (Cognex IS7905M-353-5, Macro 3-1248, lens: focal distance 18-108 mm, F2.5, illumination: transmission) and visual analysis software (InSight Explorer 4.7.3, Cognex). The fragments are placed in a flat and non-contacting manner on a transmission illumination device.

Wall Thicknesses and Diameters

The wall thickness $s_1$ of the glass container at a given position as well as the outer diameter ($d_1$) of the glass container at a given position are determined in accordance with DIN ISO 8362-1:2016-06.

Example

For inventive example 1 to 3 a glass tube (Fiolax® clear, Schott AG, Germany) having an outer diameter $d_1$ of 16 mm and a wall thickness $s_1$ of 1.0 mm is loaded into the head of a rotary machine. For inventive examples 4 and 5 a glass tube (Fiolax® clear, Schott AG, Germany) having an outer diameter $d_1$ of 30 mm and a wall thickness $s_1$ of 1.2 mm is loaded into the head of a rotary machine. While rotating around its major axis the glass tube is heated to its softening point with separation gas burners as shown in FIG. 1 and the heated glass is pulled along its major axis by moving the clamping chucks creating two separate portions of glass tube and forming a closed bottom at the upper end of the lower portion. Consecutively, the closed bottom is heated with gas burners to the glass transition temperature and brought into contact with a carbon mold matrix as further depicted in FIG. 1. When bringing the mold matrix into contact with the closed bottom, the distance is decreased stepwise in a first and second step. The ratio of the distance decreased in the first step to the distance decreased in the second step ($Y^1_m/Y^2_m$; see FIG. 4) was 30. Furthermore, the second step was performed with a time delay ($\Delta t$) of 1.5 sec after the first step. In a Comparative Example representing the prior-art process the mold matrix is brought into contact with the closed bottom in a single step without any delay. For inventive examples 2 and 3 an ion-exchange post treatment (490° C./20 h, 100% $KNO_3$) is performed.

For comparative example 1 representing the prior-art process a glass tube (Fiolax® clear, Schott AG, Germany) having an outer diameter $d_1$ of 16 mm and a wall thickness $s_1$ of 1.0 mm is loaded into the head of a rotary machine. For comparative example 2 a glass tube (Fiolax® clear, Schott AG, Germany) having an outer diameter $d_1$ of 30 mm and a wall thickness $s_1$ of 1.2 mm is loaded into the head of a rotary machine. The mold matrix is not brought into contact with the closed bottom stepwise as shown in FIG. 3, but in a single step.

For comparative example 3 representing the prior-art process a glass tube (BFX) having an outer diameter $d_1$ of 16 mm and a wall thickness $s_1$ of 1.0 mm is loaded into the head of a rotary machine. The mold matrix is not brought into contact with the closed bottom stepwise as shown in FIG. 3, but in a single step. Additionally, an ion exchange post treatment at 450° C. for 12 h with $KNO_3$ is performed.

| | Axial load A | number of fragments B | $h_2$ | fracture ratio C |
|---|---|---|---|---|
| inventive example 1 (2R) | 3885N | 119 | 22 mm | 427N × cm² |
| inventive example 2 (2R) | 2736N | 198 | 22 mm | 181N × cm² |
| inventive example 3 (2R) | 2714N | 273 | 22 mm | 130N × cm² |
| inventive example 4 (30R) | 4175N | 592 | 55 mm | 415N × cm² |
| inventive example 5 (30R) | 4543N | 318 | 55 mm | 841N × cm² |
| comp. Example 1 (2R) | 802N | 5 | 22 mm | 2069N × cm² |
| comp. example 2 (30R) | 935N | 25 | 55 mm | 2203N × cm² |
| comp. Example 3 (2R) | 8597N | 2868 | 22 mm | 39N × cm² |

Referring specifically now to the drawings, FIG. 1 shows a glass processing machine 100 that illustrates a process for the preparation of glass container 300 provided according to the present invention. In such a glass processing machine 100 both the tubes (part A: large wreath 102A) and the separated vials (part B: small wreath 102B) are held vertically in rotating chucks on two adjacent rotating rings 102A, 102B. This type of machine has the working positions (1 to 16: part A and 1 to 8: part B) arranged one after, between which the tubes and vials are transported by the wreaths in clocked fashion. Station 101a at the point that connects the two rings 102A,102B corresponds to the separation station at which the glass tube is heated at a defined position by means of two separation gas burners 103 so far that it becomes deformable. As soon as this temperature is reached, the tube—under continuing rotation and heating by the burner 103—is extended in axial direction by a linear downwards movement of the lower chuck (see reference number 206 in FIG. 2). Thereby the tube in the heated region extends under simultaneous tapering of its diameter, so that a constriction region in the form of a glass thread results. After the downward movement the constriction region can be further heated. After the lower portion of the glass tube has been finally separated (end of process step I; see FIGS. 2A-C) of the process provided according to the present invention), the glass is liquefied on positions 2 to 4 of the B-wreath 102B under massive input of heat at the upper edge of the lower portion of the glass tube in order to finally shape the bottom geometry (see FIGS. 3A-C).

Figures 2A, 2B, 2C:
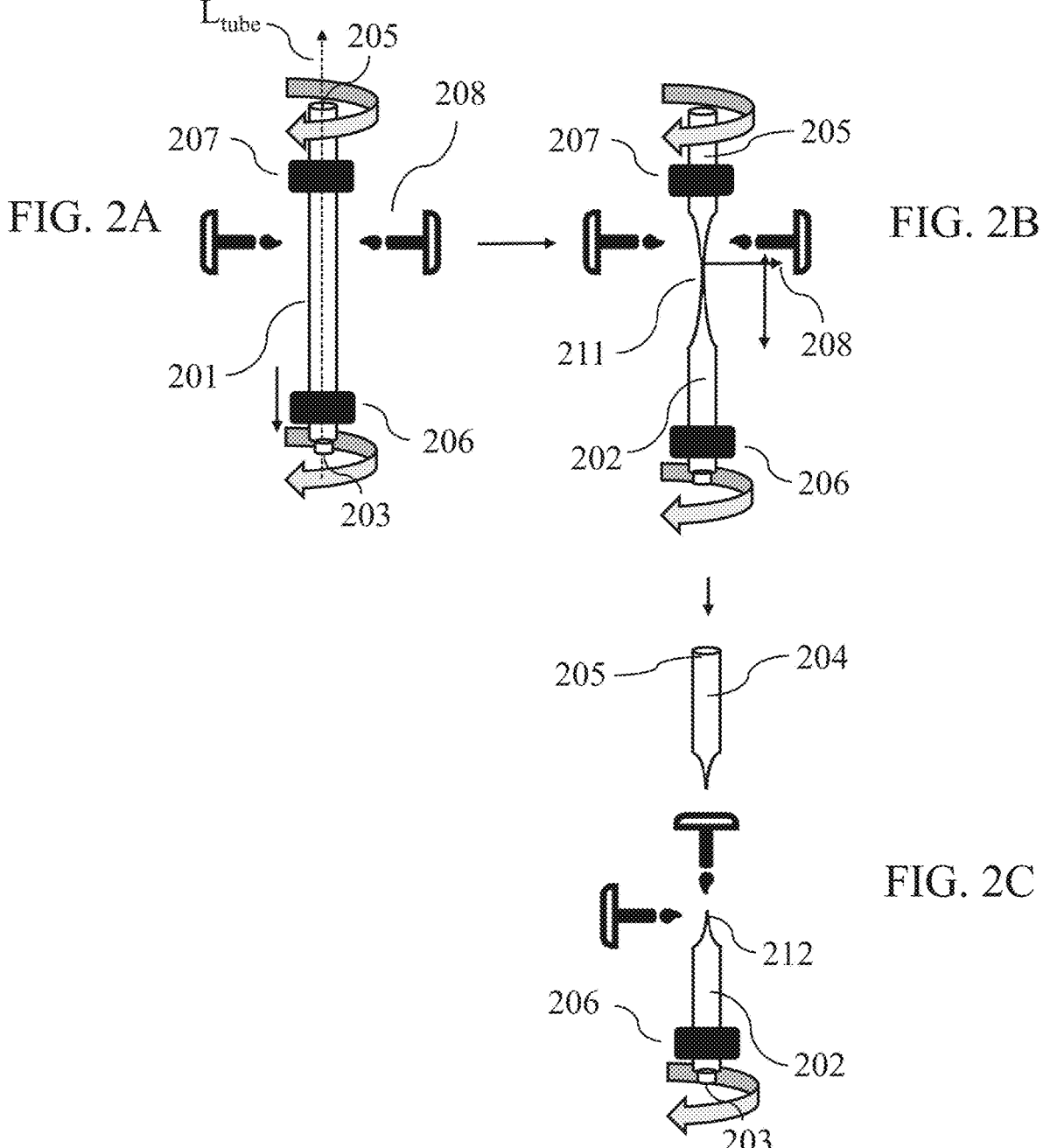
FIGS. 2A-C illustrate process step I) of this process.

FIGS. 2A-C illustrate process step I) of a process that can be used to prepare a glass container provided according to the present invention as it can be performed, for example, at separation station 101a in glass processing machine shown in FIG. 1. A glass tube 201 that comprises a first portion 202 with a first end 203, a second portion 204 with a second end 205 and a longitudinal axis $L_{tube}$ that passes through the center of the first and the second end (203,205) is loaded in a glass processing machine 100 comprising a plurality of processing stations 101, first and second clamping chucks 206,207 which are adapted and arranged to hold the glass tube 201 while rotating the glass tube 201 around its longitudinal axis $L_{tube}$ and to transport the rotating glass tube 201 from one glass container processing station 101 to the next one, a heating device 208 and a mold matrix 209. In process step I) of the process the glass tube 201 is heated at a defined position between the first portion 202 and the second portion 204 to a temperature above the glass transition temperature while the glass tube 201 is rotating around its longitudinal axis $L_{tube}$ (FIG. 2A) and the first portion 202 and the second portion 204 are pulled apart (FIG. 2B). In the process shown in FIG. 2 the first portion 202 and the second portion 204 are pulled apart by moving downwards the lower clamping chucks 206 while the glass tube 201 is rotating around its longitudinal axis $L_{tube}$. When moving downwards the lower clamping chucks 206 and thus also the lower portion 202 of the glass tube 201, a glass thread 211 is formed (see FIG. 2B). At the end of process step I) the first portion 202 is separated from the second portion 204 and a closed bottom 210 is formed at one end 212 of the first portion 202 (FIG. 2C).

FIGS. 3A-C illustrate process step II) of a process that can be used to prepare a glass container provided according to the present invention. As shown in that FIG., a mold matrix 209 is moved towards the closed bottom 210 and is brought into contact with the closed bottom 210 of the first portion 202. As shown in FIGS. 3A-C, the process provided according to the present invention is characterized in that, while bringing the mold matrix 209 into contact with the closed bottom 210, a distance $Y_m$ between the mold matrix 209 and the first clamping chuck 206 is decreased stepwise, wherein—as shown by means of the dashed lines in FIG. 4—$Y_m$ is the shortest distance between the upper end of the first clamping chuck 206 and the bottom end of the mold matrix 209, i.e., the surface of the mold matrix 209 that comes into contact with the mass of molten glass at the closed bottom 210, wherein $Y_m$ is measured in a direction parallel to longitudinal axis $L_{tube}$. In the exemplary embodiment of the process as shown in FIGS. 2 and 3, the first and second clamping chucks 206, 207 are adapted and arranged to hold the glass tube 201 in a vertical position, wherein the second portion 204 of the glass tube 201 corresponds to the upper portion 204 of the glass tube 201 having an upper end 205 and the first portion 202 of the glass tube 201 corresponds to the lower portion 202 of the glass tube 201 having a lower end 203. Accordingly, the first clamping chucks 206 are arranged as lower clamping chucks 206 holding the lower portion 202 of the glass tube 201 and the second clamping chucks 207 are arranged as upper clamping chucks 207 holding the upper portion 204 of the glass tube 201, wherein the one end 212 is opposite of the lower end 203.

Figures 4A, 4B:
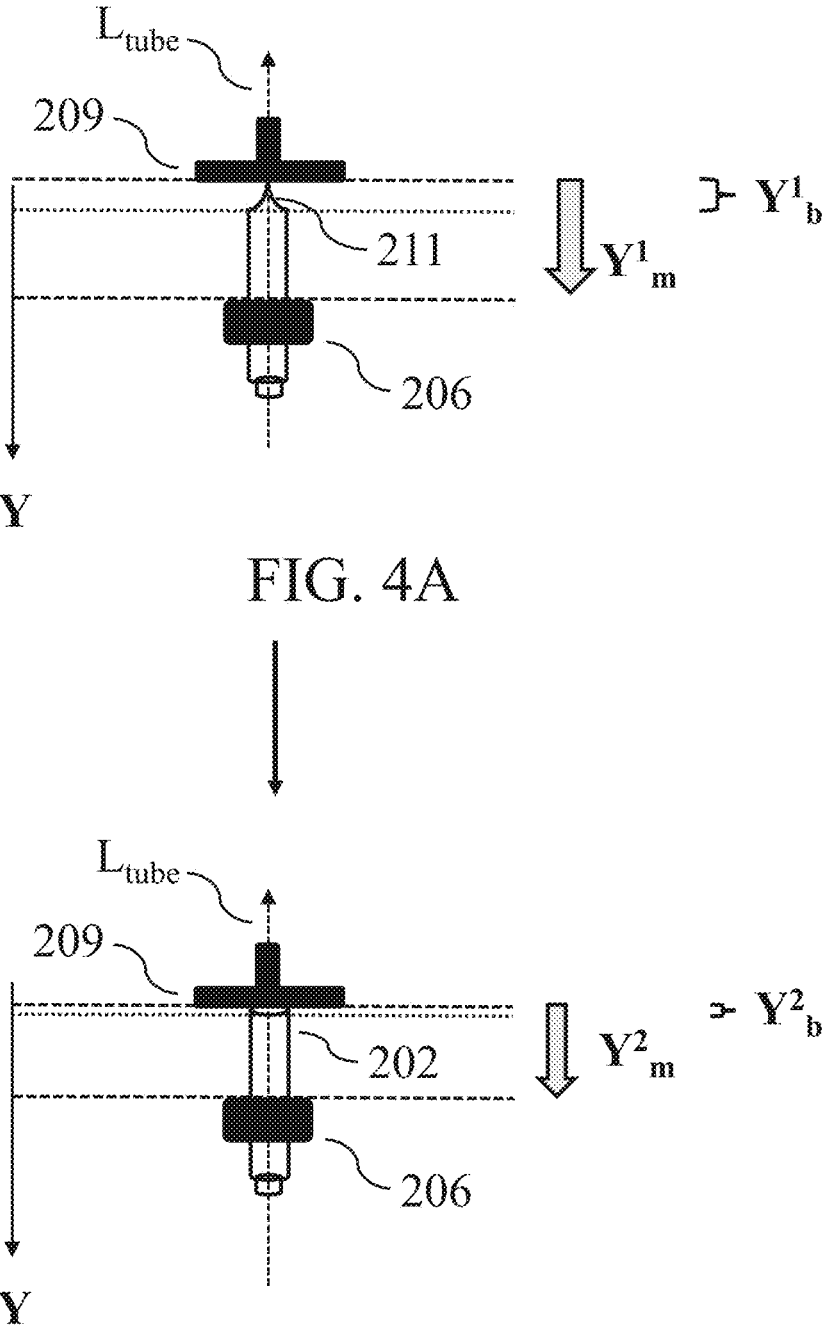
FIGS. 4A-4B illustrate in more detail the movement of a mold matrix relative to first clamping chucks in process II) of this process.

FIGS. 4A and 4B show in more detail the movement of the mold matrix 209 relative to the first clamping chucks 206 in process II) of the process that can be used to prepare a glass container provided according to the present invention. As shown in these FIGS., distance $Y_m$ between the mold matrix 209 and the first clamping chuck 206 is decreased in a first step (as shown in FIG. 4A) by a first distance $Y^1_m$ and a second step (as shown in FIG. 4B) by a second distance $Y^2_m$, optionally the first step and the second step are successive. As shown in FIG. 4, the first distance $Y^1_m$ is larger than the second distance $Y^2_m$, wherein the first distance $Y^1_m$ is 19 mm or less, and the second distance $Y^2_m$ is 1 mm or less. Optionally, there is a time delay $\Delta t$ between the first step shown in FIG. 4A and the second step shown in FIG. 4B, wherein $\Delta t$ optionally is 0.1 sec or more.

As also shown in FIGS. 4A and 4B, a final distance defined by a gap $Y_b$ between the mold matrix 209 and closed bottom 210 is in the first step optionally defined by a first gap $Y^1_b$ and in the second step optionally defined by a second gap $Y^2_b$, wherein it may also be provided that the first gap $Y^1_b$ is larger than the second gap $Y^2_b$. It may also be provided that the first gap $Y^1_b$ is 8 mm or less and that the second gap $Y^2_b$ is 2 mm or less.

Figure 5:
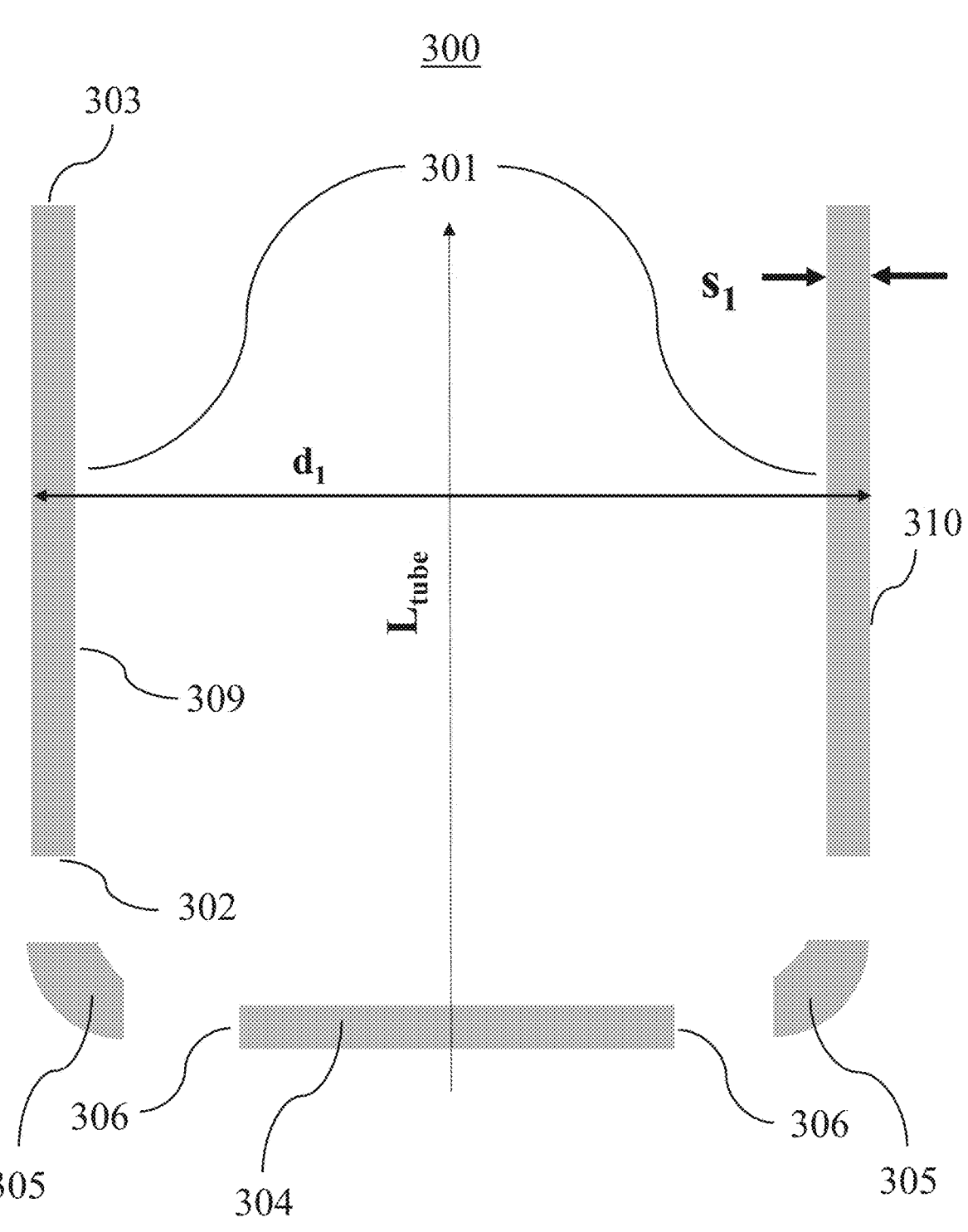
FIG. 5 illustrates a cross-sectional view of a glass container provided according to the present invention, where for the purpose of an improved illustration the parts of the glass container have been separated from each other.

FIG. 5 shows a cross-sectional view of a glass container 300 provided according to the invention. For the purpose of an improved illustration the individual parts of the glass container (i. e. glass tube 301, glass bottom 304 and curved glass heel 305) have been separated from each other. However, as the glass container 300 provided according to the invention is optionally obtained by a process in which a mother tube (which forms glass tube 301), while rotating around its major axis, is heated to its softening point with flames, in which the heated glass is pulled along its major axis for stretching and creating a container closure and in which the container closure has been shaped to form a glass bottom 304 and a curved glass heel 305, these parts are integrally connected in the glass container 300 provided according to the present invention. As shown in FIG. 5, the glass tube 301 is characterized by a first end 302 and a further end 303. The glass bottom 304 comprises an outer region 306 that in the glass container 300 is connected to the curved glass heel 305. The glass tube 301 is characterized by a longitudinal axis $L_{tube}$, an outer diameter $d_i$ and a wall thickness $s_1$.

Figure 6:
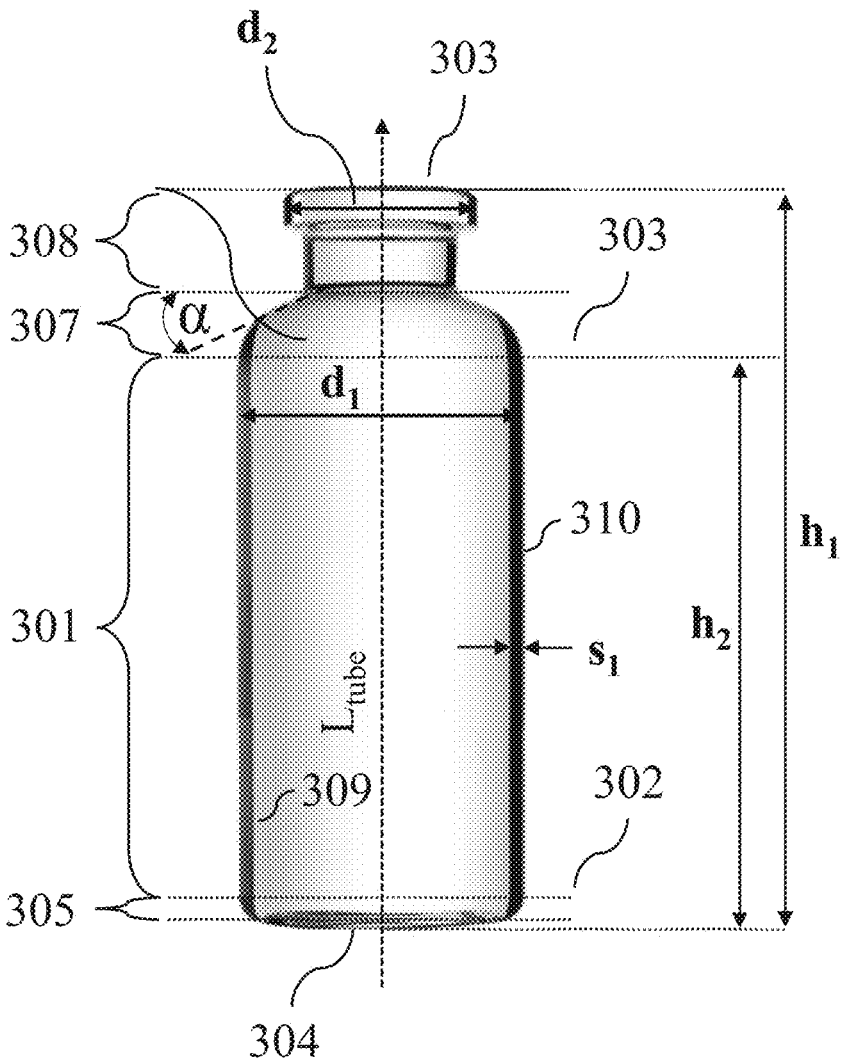
FIG. 6 illustrates a side view of a glass container provided according to the present invention.

FIG. 6 shows a side view of glass container 300 provided according to the present invention. The glass container 300 comprises as a container part a glass body 301 in the form of a glass tube having a glass thickness $s_1$ and an outer diameter $d_1$ with a first end 302 and a further end 303, the glass body 301 being characterized by a longitudinal axis $L_{tube}$ that passes through the center of the first and the further end 302,303. The glass container 300 further comprises as a container part a circular glass bottom 304 that closes the glass body 301 at the first end 302. The glass container 300 further comprises a curved glass heel 305 extending from an outer end of the circular glass bottom 304 to the first end 302 of the glass body 301. In addition to the container parts shown in FIG. 5, the glass container 300 further comprises a top region 308 in which the maximum outer diameter of the glass tube is $d_2 < d_1$, the top region optionally comprising an opening of the glass container, and a shoulder region 307 that connects the further end 303 of the body region 301 with the top region 308, wherein the shoulder region 307 is characterized by a shoulder angle $\alpha$.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE NUMERALS 100 glass processing machine
101,101a,101b,101c processing stations
102,102A,102B circle (or wreath) comprising processing stations 107
103 separation gas burner
200 glass container
201 glass tube
202 first or lower portion of the glass tube 201
203 first or lower end of the first or lower portion 202
204 second or upper portion of the glass tube 201
205 second or upper end of the second or upper portion 204
206 first or lower clamping chucks
207 second or upper clamping chucks
208 heating device, optionally a separation gas burner
209 mold matrix
210 closed bottom
211 glass thread
212 one end of the first or lower end of the first or lower portion 202
300 glass container
301 glass body
302 first end of glass body 301
303 further end of glass body 301
304 glass bottom
305 curved glass heel
306 outer end of the glass bottom 304
307 shoulder region
308 top region
309 inner surface of the glass container
310 outer surface of the glass container

What is claimed is:

1. A glass container, comprising:
   a top region;
   a shoulder region;
   a body region with a first end and a second end, the second end being adjacent to the shoulder region, the body region having an outer diameter $(d_1)$ and a glass thickness $(s_1)$, the body region being characterized by a longitudinal axis $(L_{tube})$ that passes through a center of the first end and the second end;
   a circular glass bottom closing the body region at the first end; and
   a curved glass heel extending from an outer end of the circular glass bottom to the first end of the body region;
   wherein, when the glass container is standing on a support surface with the circular glass bottom being in contact with the support surface, $h_2$ is the distance between the support surface up to the second end of the body region;

wherein the following condition is fulfilled: $(A \times X)/B = C$, wherein A is an axial load in N, which is necessary to break the glass container to obtain fragments, X is a normalized area in $cm^2$ defined as $h_2 \times d_1 \times \pi + d_1^2/4 \times \pi$, B is a number of fragments of the glass container, each fragment having a fragment area of 0.3 $mm^2$ or more and 1.0 $mm^2$ or less, and C is a fracture ratio, wherein C is 40 $N \times cm^2$ or more and B is 30 or more.

2. The glass container of claim 1, wherein the fracture ratio C is 45 $N \times cm^2$ or more and/or 2000 $N \times cm^2$ or less.

3. The glass container of claim 1, wherein the axial load A is 1000 N or more and/or 8000 N or less.

4. The glass container of claim 1, wherein the number of fragments B is 100 or more and/or 2800 or less.

5. The glass container of claim 1, wherein the fragment area is 0.35 $mm^2$ or more and 0.95 $mm^2$ or less.

6. The glass container of claim 1, wherein a ratio of number of fragments B to normalized area X is 0.5 $cm^{-2}$ or more and/or 200 $cm^{-2}$ or less.

7. The glass container of claim 1, further comprising an inner surface directed to an inside of the glass container and an outer surface directed to an outside of the glass container, wherein:

the inner surface and/or the outer surface exhibits a chemical and/or thermal compressive stress; and/or the inner surface and/or the outer surface exhibit a compressive stress of 800 MPa or less; and/or wherein the inner surface and/or the outer surface exhibit a compressive stress of 10 MPa or more.

8. The glass container of claim 1, further comprising an inner surface directed to an inside of the glass container and an outer surface directed to an outside of the glass container, wherein:

the inner surface and/or the outer surface does not exhibit a chemical compressive stress; and/or the inner surface and/or the outer surface exhibit a compressive stress of 10 MPa or less; and/or wherein the inner surface and/or the outer surface exhibit a compressive stress of 0.01 MPa or more.

9. The glass container of claim 1, wherein the glass container is a pharmaceutical container and/or a vial.

10. The glass container of claim 1, wherein the glass container is filled with a composition.

11. The glass container of claim 10, wherein the composition is a pharmaceutical composition comprising a pharmaceutical active substance.

12. The glass container of claim 1, wherein the glass container is closed by a closure device, and/or the glass container is stored in a nest and tub.

13. The glass container of claim 1, wherein the glass container is closed by a closure device comprising a stopper or a cap.

14. The glass container of claim 1, wherein the glass container is stored in a nest and tub, wherein the tub is sealed with a lid and/or enclosed by at least one bag.

15. The glass container of claim 1, wherein $d_1$ is in the range from 13 to 65 mm and/or $s_1$ is in the range from 0.5 to 3.0 mm and/or $h_2$ in the range from 15 to 100 mm.

16. A plurality of glass containers, each glass container comprising:

a top region;

a shoulder region;

a body region with a first end and a second end, the second end being adjacent to the shoulder region, the body region having an outer diameter ($d_1$) and a glass thickness ($s_1$), the body region being characterized by a longitudinal axis ($L_{tube}$) that passes through a center of the first end and the second end;

a circular glass bottom closing the body region at the first end; and a curved glass heel extending from an outer end of the circular glass bottom to the first end of the body region;

wherein, when the glass container is standing on a support surface with the circular glass bottom being in contact with the support surface, $h_2$ is the distance between the support surface up to the second end of the body region;

wherein the following condition is fulfilled: $(A \times X)/B = C$, wherein A is an axial load in N, which is necessary to break the glass container to obtain fragments, X is a normalized area in $cm^2$ defined as $h_2 \times d_1 \times \pi + d_1^2/4 \times \pi$, B is a number of fragments of the glass container, each fragment having a fragment area of 0.3 $mm^2$ or more and 1.0 $mm^2$ or less, and C is a fracture ratio, wherein C is 40 $N \times cm^2$ or more and B is 30 or more.

17. The plurality of glass containers of claim 16, wherein the plurality of glass containers comprises at least 10 glass containers and at most 1000 glass containers.

18. The plurality of glass containers of claim 17, wherein the fracture ratio C is 80 $N \times cm^2$ for at least 50% of the glass containers contained in the plurality of glass containers.

\* \* \* \* \*